US009985979B2

(12) United States Patent
Pegna et al.

(10) Patent No.: US 9,985,979 B2
(45) Date of Patent: *May 29, 2018

(54) METHOD AND SYSTEM FOR DETECTING THREATS USING PASSIVE CLUSTER MAPPING

(71) Applicant: Vectra Networks, Inc., San Jose, CA (US)

(72) Inventors: David Lopes Pegna, San Carlos, CA (US); Nicolas Beauchesne, Miami Beach, FL (US)

(73) Assignee: VECTRA NETWORKS, INC., San Jose, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 14/944,128

(22) Filed: Nov. 17, 2015

(65) Prior Publication Data
US 2016/0149936 A1  May 26, 2016

Related U.S. Application Data

(60) Provisional application No. 62/081,505, filed on Nov. 18, 2014.

(51) Int. Cl.
G06F 11/00 (2006.01)
G06F 12/14 (2006.01)
G06F 12/16 (2006.01)
G08B 23/00 (2006.01)
H04L 29/06 (2006.01)
H04L 29/08 (2006.01)
G06F 21/55 (2013.01)

(52) U.S. Cl.
CPC ........ H04L 63/1416 (2013.01); G06F 21/552 (2013.01); H04L 63/1425 (2013.01); H04L 67/22 (2013.01)

(58) Field of Classification Search
None
See application file for complete search history.

(56) References Cited

U.S. PATENT DOCUMENTS 7,114,183 B1 *  9/2006  Joiner ................... H04L 43/045
                                                   713/188
2003/0236995 A1  12/2003  Fretwell
(Continued)

FOREIGN PATENT DOCUMENTS

WO  20140128253 A1  8/2014

OTHER PUBLICATIONS

Extended European Search Report dated Aug. 16, 2017 for EP Appln. No. 15860193.0.
(Continued)

Primary Examiner — Kambiz Zand
Assistant Examiner — Arezoo Sherkat
(74) Attorney, Agent, or Firm — Vista IP Law Group, LLP

(57) ABSTRACT

An approach for detecting network threats is disclosed, that may involve receiving network traffic, plotting the network traffic in a n-dimensional feature space to form a network map, generating a client signature at least by placing new client points in the map, setting a threshold, and generating an alarm if one or more client activity points exceed the threshold. In some embodiments, the network map and the client signature are updated using sliding windows and distance calculations.

24 Claims, 18 Drawing Sheets

(56) References Cited

U.S. PATENT DOCUMENTS

| | | | |
|---|---|---|---|
| 2004/0039968 A1* | 2/2004 | Hatonen | G06K 9/6284 714/39 |
| 2007/0050497 A1* | 3/2007 | Haley | H04L 43/0817 709/224 |
| 2009/0234899 A1* | 9/2009 | Kramer | G06F 17/30539 708/200 |
| 2011/0238855 A1 | 9/2011 | Korsunsky et al. | |
| 2015/0058982 A1* | 2/2015 | Eskin | G06F 17/30914 726/23 |

OTHER PUBLICATIONS

International Search Report and Written Opinion dated May 2, 2016 for PCT Appln. No. PCT/US15/61187.

\* cited by examiner

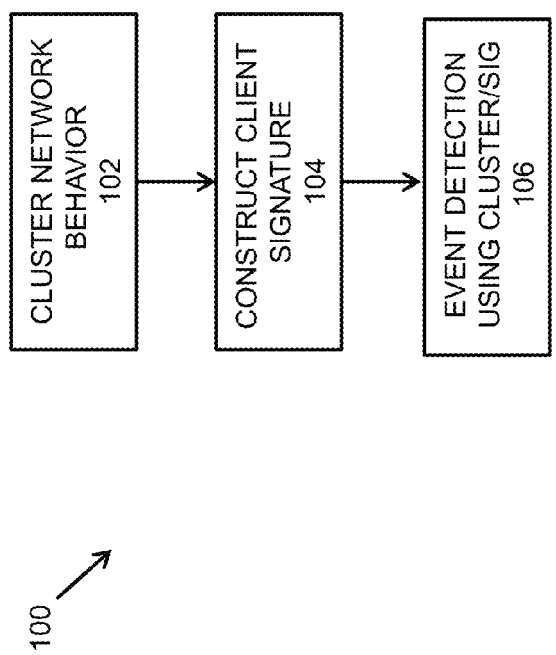

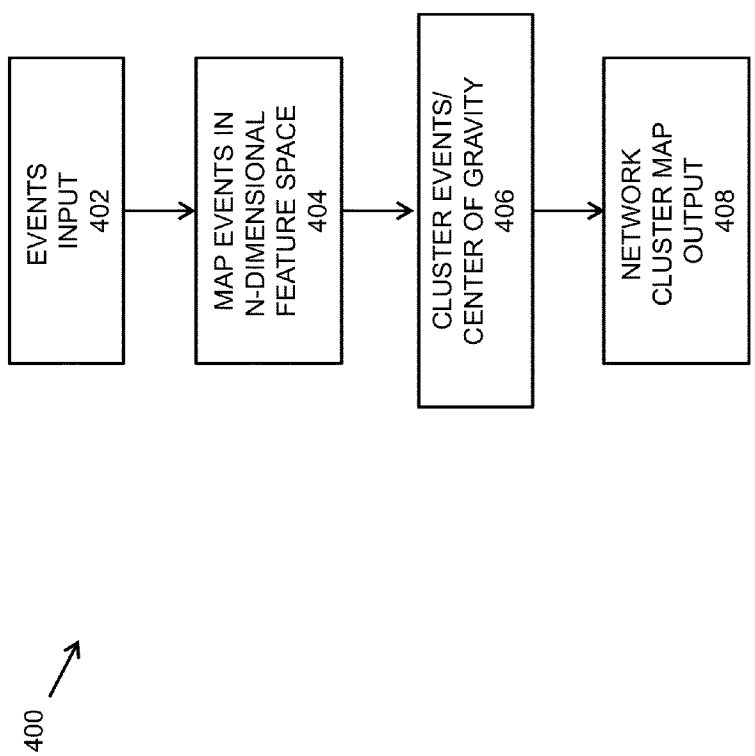

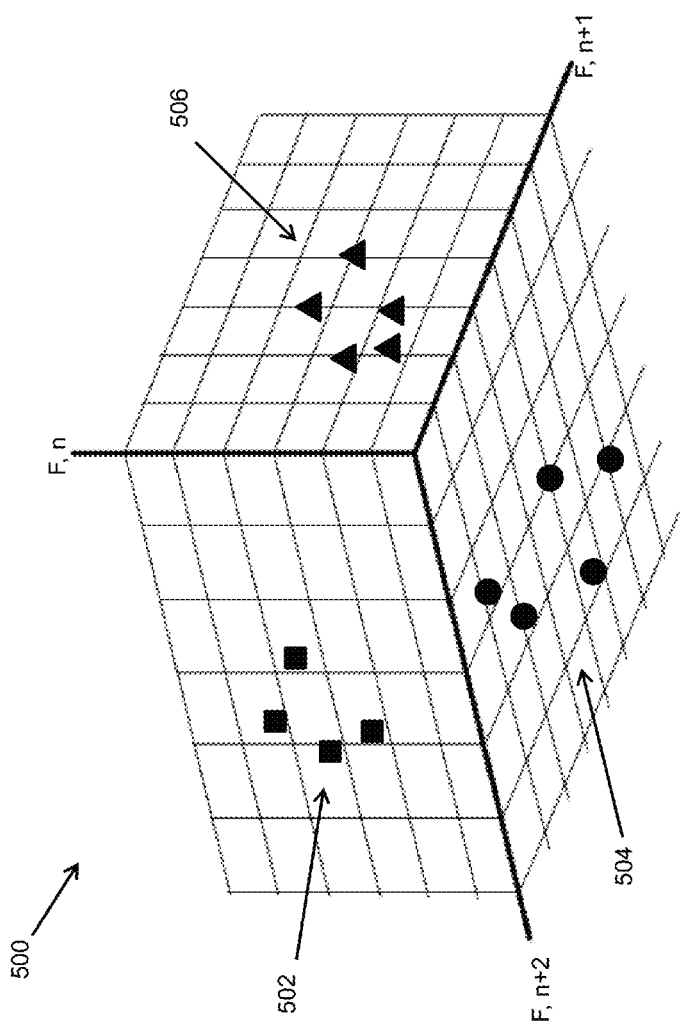

METHOD AND SYSTEM FOR DETECTING THREATS USING PASSIVE CLUSTER MAPPING

CROSS-REFERENCE TO RELATED APPLICATIONS

The present application claims the benefit of U.S. Provisional Application Ser. No. 62/081,505, filed on Nov. 18, 2014, titled "METHOD AND SYSTEM FOR DETECTING THREATS USING PASSIVE CLUSTER MAPPING", the content of the aforementioned application is hereby incorporated by reference in its entirety.

BACKGROUND

In recent years, it has become increasingly difficult to detect threats on enterprise networks without costly disruption. Various types of security products have been deployed to increase the security of enterprise networks. However generally the security products have sets of rules or guidelines that cannot be modified without creating exposure to unknown risks. Thus, every modification or customization to security rules must undergo strict and thorough testing to ensure the proposed change is secure and that it will not inadvertently block a mission-critical application before it is implemented in live enterprise networks. While this thorough testing process may increase safety, it drastically reduces the speed and capability of networks to quickly adapt to new threats.

Furthermore, many companies do not have the capability, time, or resources to continuously update their network security products in a way that is both safe and compatible with their networks. As such, the only option for many companies is to simply adopt a well-known security product and wait for new trusted updates to hopefully appear in time before new threats wreak havoc on company networks.

As is evident, there is a demand for an approach to detect malicious activity on networks in a passive manner that does not require expensive, slow, invasive updates to security products, or reliance on trusted third party updates which may or may not occur in time before new threats cause network harm.

SUMMARY

In some embodiments, a cluster engine may be implemented to detect network threats in communications networks. The cluster engine may first train itself by creating a cluster map for a given network. The training stage or window may create a cluster map by plotting a number of network events in an n-dimensional feature space. As more network events are added to the n-dimensional feature space, they may form a number of natural clusters for different types of network activity. Centroid algorithms, e.g., center of mass or gravity algorithms, may be applied to the collection of network events to identify these clusters and determine their centers of gravity. In some embodiments, the clusters and center of gravity points in n-dimensional may be output as network cluster maps.

In some embodiments, the system may also train itself to create one or more client signatures. Client signatures may be created by adding client events to the cluster map, determining the distance between each client event and the closest cluster's center of gravity, combining the distances using methods such as averaging to create a number of summarized or aggregated client points in a training window. The training window data may be used to set an alarm threshold. During detection, if an aggregated client point exceeds the threshold, it may be categorized as suspicious activity and an alarm may be generated.

BRIEF DESCRIPTION OF THE DRAWING

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 1 shows a high-level flowchart of an approach for detecting threats using passive cluster mapping.

FIG. 4 shows a flowchart of an approach for creating a network cluster map.

FIGS. 5A-5D illustrate examples for creating a network cluster map in a feature space.

DETAILED DESCRIPTION

Figure 2A:
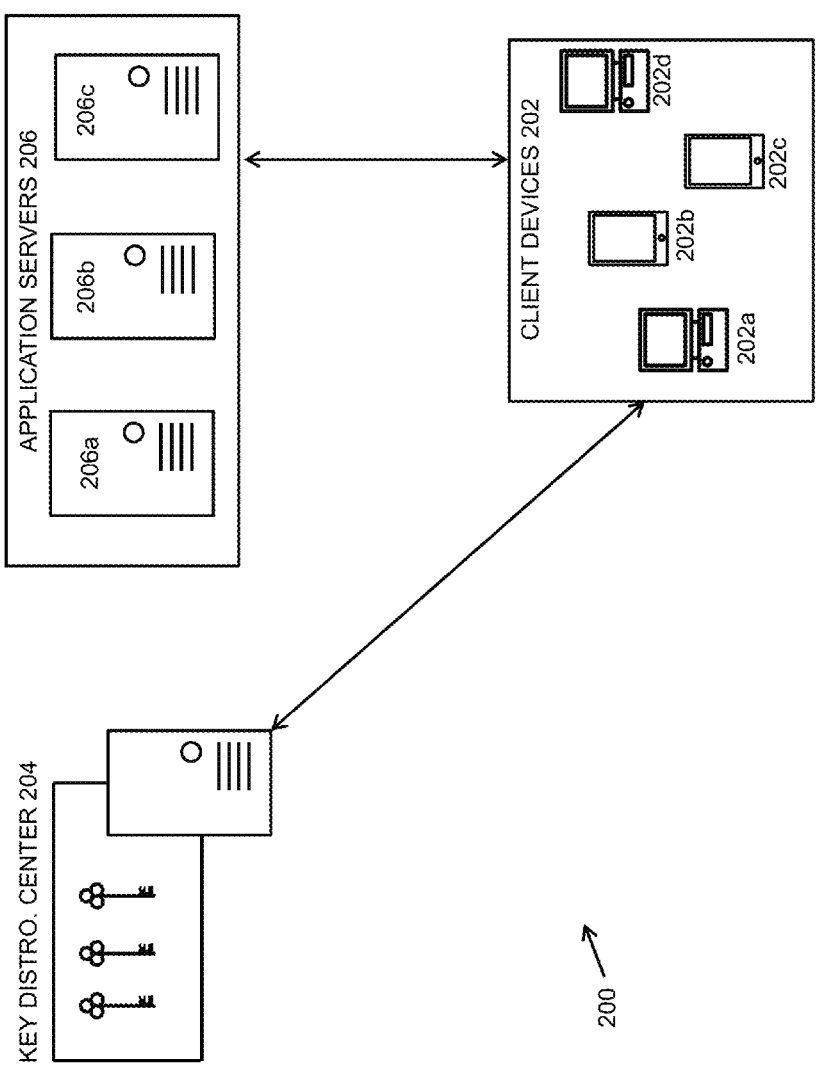
FIG. 2A illustrates an example system architecture in which cluster mapping may be implemented.

Various embodiments of the invention are directed to a method, system, and computer program product for passive cluster mapping. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Before describing the examples illustratively depicted in the several figures, a general introduction is provided to further understanding.

In some embodiments, a cluster engine may be implemented to passively detect threats in communication networks. The cluster engine may first train itself by creating a network cluster map for a given network. The training stage or window may create a cluster map by constructing an n-dimensional feature space for a number of network events. As more network events are added to the n-dimensional feature space, a number of natural network clusters for different types of network activity are formed. Centroid algorithms, e.g., center of mass or gravity algorithms, may be applied to the network events to determine a center of gravity for the identified clusters. In some embodiments, the clusters and center of gravity points in the n-dimensional feature space may be output as one or more network cluster maps.

The system may then train itself to create one or more client signatures. Though client signatures are used as an example how one or more embodiments may be implemented, one of ordinary skill in the art appreciates that other signatures (e.g., server, node, or entity signatures) may similarly be implemented.

In some embodiments, client signatures may be created by adding client events to the network cluster map, determining the distance from the client event to the closest cluster's center of gravity in the n-dimensional feature space, combining the distances using methods such as averaging to create a number of summarized or aggregated client points in a training window. The training window data identifies what may be used to set an alarm threshold. In some embodiments, during the detection phase, client events are added to the client signature and if an aggregated client point exceeds the threshold it may be categorized as suspicious activity and an alarm may be generated.

FIG. 1 shows an example approach 100 for detecting threats using passive cluster mapping. At 102, a cluster map for a network may be created in a network training phase by clustering the network activity events in an n-dimensional feature space, identifying clusters for common network events, and determining their center of gravity points, and outputting a network cluster map. At 104, a client signature may be created by adding client events or activity points to the network cluster map, determining distances from the one or more client event points to the closest cluster's center of gravity points, and combining the distances using an aggregation process, such as averaging, to create aggregate client points which may be displayed on an aggregate client plot. Once a sufficient number of aggregate client points are determined in a training window, a threshold may be generated.

At 106, a detection phase may initiate. During the detection phase, aggregate client points may be added to the aggregate client plot as they are generated. If one or more aggregate client points exceed the threshold, it may be considered as suspicious activity, labeled a threat, and an alarm may be generated. The above process is explained as a mere high-level example. One of ordinary skill in the art will appreciate that the steps and features may be modified or combined in different ways to achieve similar efficiencies and results.

FIG. 2A illustrates an example environment 200 in which a cluster engine may be implemented. The example environment illustrates a network employing the Kerberos authentication/authorization protocol, though one of ordinary skill in the art appreciates that other protocols and schemes may similarly be implemented. As a brief explanation, the Kerberos authentication protocol generally works as follows.

The Kerberos architecture contains a minimum of three systems, a client 202a, a server/service 206a and a Kerberos Domain Controller (KDC) 204, which holds keys it shares with each client and service. The first step is for a client 202a to authenticate itself with a realm (which can be thought of as a namespace) managed by the KDC 204. Once authenticated, using the secret shared by the client and the KDC, the KDC provides the client 202a with a session key and a ticket granting ticket (TGT). This session key can be used for a predefined length of time as a "passport" inside the network. The TGT is encrypted with the KDC master key and is later used by the KDC for service authorization. This encryption scheme allows for stateless distributed deployments of KDC infrastructure.

When a client 202a needs to access a service/application/server such as 206a, it sends the session key, the TGT and an access request to the KDC 204 for the service 206a. The KDC can decrypt the TGT using its master key, thereby ensuring that the TGT is authentic. Having completed the authentication phase, the KDC can then perform the authorization phase, which determines whether client 202a is allowed to access service 206a. Once the request passes this check, since the KDC 204 maintains shared secrets and session keys with both the service 206a and the client 202a, it can construct and send a ticket granting service (TGS) reply to the client 202a that is encrypted with both the user 202a session key and the service 206a session key. Once the client 202a receives the TGS, it can start to communicate directly with the application server 206a. The client 202a sends the part of the TGS that was encrypted by the KDC 204 with session key of 206a to application server 206a. Once the application server 206a has used its own session key with KDC 204 to verify the validity of the TGS, it knows that KDC 204 has approved client 202a to access the service it provides and it then gives access to the service to client 202a.

Figure 2B:
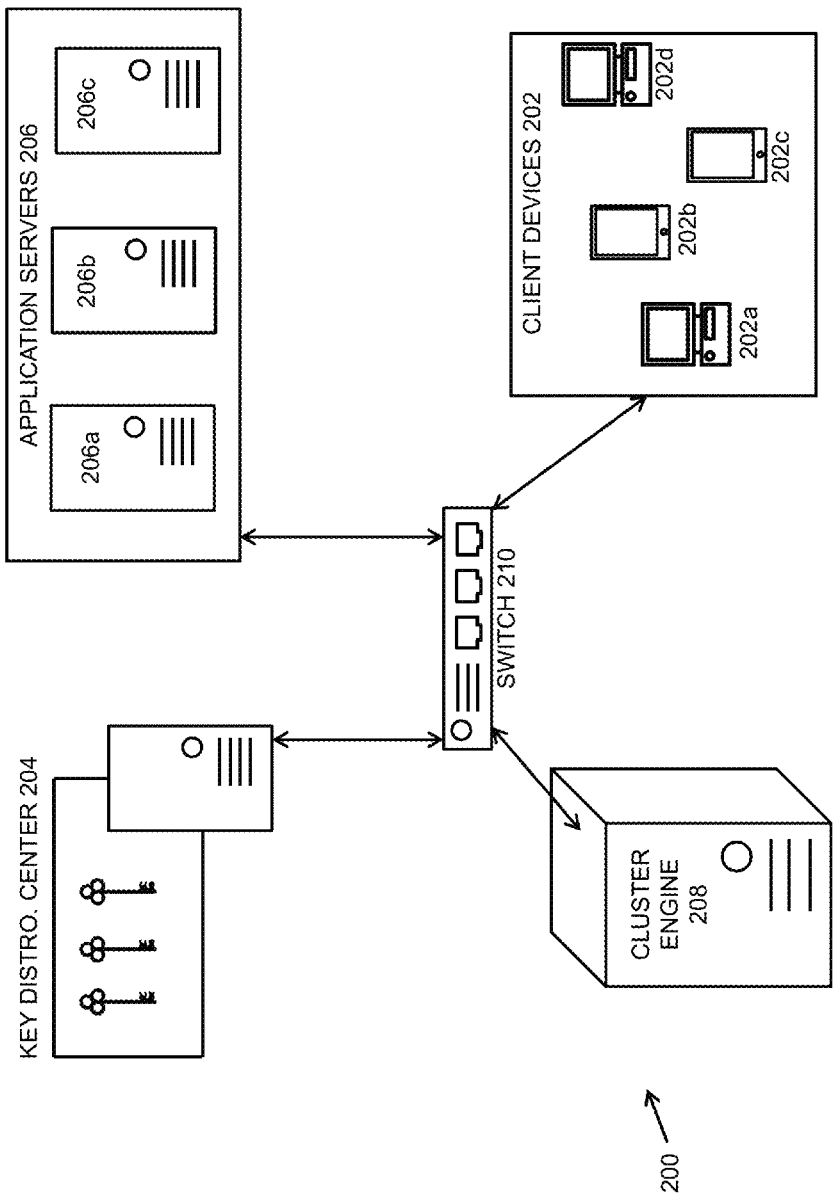
FIG. 2B illustrates an example system architecture implementing cluster mapping with a cluster engine.

FIG. 2B shows how a cluster engine 208 may be deployed in a complex network 200, such as a network using the Kerberos authentication protocol. In some embodiments, the cluster engine 208 may receive network communications for the network 200 through a network switch 210. The cluster engine 208 can also be implemented as software that resides upon networking equipment (e.g., a network firewall), nodes, or other types of entities in a network. Further, the cluster engine 208 may also be implemented in a virtual machine and can be deployed on hardware supplied by the company that owns the network.

Once the information is copied off the switch or otherwise received it may be then analyzed by the cluster engine 208 to conduct threat detection. The implementation shown in FIG. 2B is shown merely as an example, other variations include using the cluster engine to tap communications between the KDC and client devices but not the communications between client devices and application servers, or using the cluster engine to tap communications between the client devices and the application servers but not the KDC, or directly integrating the cluster engine into the KDC, and other combinations. Further details of an example approaches for network traffic collection and pre-processing to generate features for dimensional analysis (e.g., for input into a feature space plot) is described in U.S. Non-Provisional application Ser. No. 14/643,931, titled "A SYSTEM AND METHOD FOR DETECTING INTRUSIONS THROUGH REAL-TIME PROCESSING OF TRAFFIC WITH EXTENSIVE HISTORICAL PERSPECTIVE", filed on Mar. 10, 2015, which is hereby incorporated by reference in its entirety.

Figure 3:
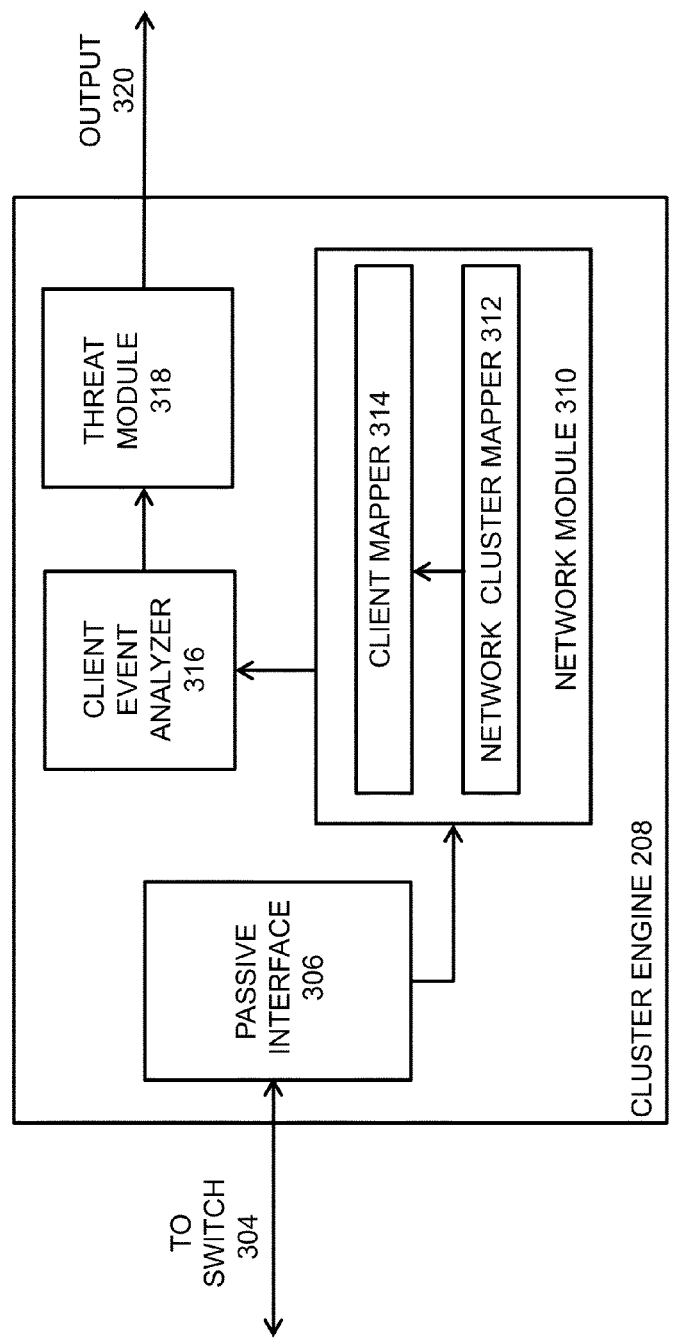
FIG. 3 illustrates example internal aspects of a cluster engine.

FIG. 3 illustrates example internal features of a cluster engine 208, as according to some embodiments. As explained, network traffic may be received through a passive means, such as TAP/SPAN, as illustrated at 304. The passive interface module 306, in one embodiment, is designed to passively receive network data tapped from the network switch 210 and store it for processing. In some embodiments, the passive interface 306 may be implemented as a buffer or caching device. In this way, the cluster engine 208 can passively intercept tapped network data for analysis without slowing down the network or modifying network data.

In some embodiments, the traffic stored in passive interface 306 is passed to network module 310, which may comprise a network cluster mapper 312 and a client mapper 314. The network cluster mapper 312 may be analyzed the network activity in an n-dimensional feature space to create clusters and determine center of gravity points for the clusters, as described in more detail below. The client mapper 314 may be used to analyze a client (e.g., clients 202a-d) to create signatures by representing client event points in the network cluster map, determine distances between the client event points and the center of gravity points, and combine the respective distances using processes such as averaging to create aggregated client feature points, as described in more detail below.

The aggregated client points may then be used by client event analyzer module 316 to create a client signature in a training phase. Further, the client event analyzer module 316 may detect threats in a threat detection phase using event thresholds. The threshold may be based at least in part on the collected aggregated client points from the training phase.

If the client event analyzer 316 detects one or more aggregated client points that exceed the threshold, the client activity corresponding to the aggregated client points may be deemed as suspicious activity and alarm data may be generated and sent to the threat module 318 for analysis. Client signatures may be updated dynamically based on the last window of activity (e.g., last 30-minute window of client activity) in a rolling buffer manner. As the client signature is dynamically updated, the threshold may be constantly adjusted. In this way, for either the case when the client signature is stable or when the client signature shows changes in activity, the threshold may shift to lower or higher values, respectively, so that the threat module 318 may properly categorize the activity as a true network threat and create an alarm as output 320. In some embodiments, the threat module 318 is bypassed and once any client point exceeds the threshold, alarm data may directly output at 320.

Figure 5A:
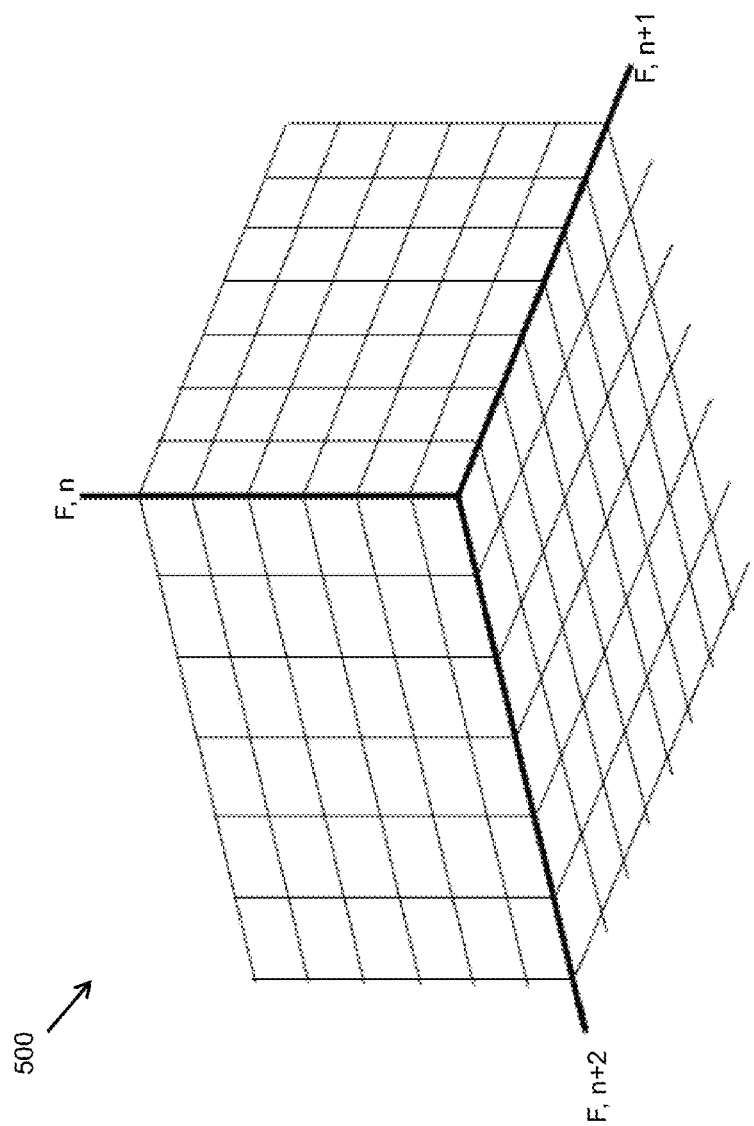

For greater understanding, FIG. 4 is explained with reference to FIG. 5A-D, which show n-dimensional feature space plots. To begin, FIG. 4 shows a process 400 for an approach on how to create a network cluster map using client activity. At 402, network events (e.g., network traffic) are input into the cluster engine for analysis. The network module 310 in the cluster engine may then map the network events in n-dimensional feature space 500, as illustrated in FIG. 5A. Each axis of the n-dimensional feature space 500 may correspond to a type of network activity, such as the identifiers corresponding to the clients (e.g., client identifiers), servers (e.g., server/host identifiers), or control modules such as a KDC; account information; services accessed by the client; or the number of times a service is accessed.

At 404, as network activity is received, the network module maps the activities in the n-dimensional feature space according to how the points rank in each dimension (e.g., their value is ranked against the value of the axes). FIG. 5B shows an example of mapping the network traffic in a network feature space. There, the "F, n" axis may correspond to the number of accounts used by a given client or node, the "F, n+1" axis may correspond to the number of times application server 206a is accessed, and the "F, n+2" axis may correspond to the number of times application server 206b is accessed.

Thus, the "triangle" network activity points or client grouping 506 may correspond to a client group of computers closely related in the number of accounts used and that they access application server 206a more times than the group accesses application server 206b (which is measured on "F, n+2"). Similarly, the "circle" client group 504 have closely related account usage, and appear to access application server 206a and application server 206b in roughly equal amounts. Similarly, the "square" client group 502 have closely related account usage, but appear to access application server 206b (which is mapped on axis "F, n+2") more frequently than they do application server 206a (which is mapped on axis "F, n+1"). The above shapes are mere representations of how network activity points may be displayed and/or grouped, though one of ordinary skill in the art will appreciate that other approaches known in the art work equally well. Further, the feature space axes chosen here (number of accounts used, and number of times application servers are accessed) are used here as mere examples, and that the n-dimensional feature space 500 can be modified or customized for any network space or implementation, sometimes reaching a very high dimensionality.

Figure 5C:
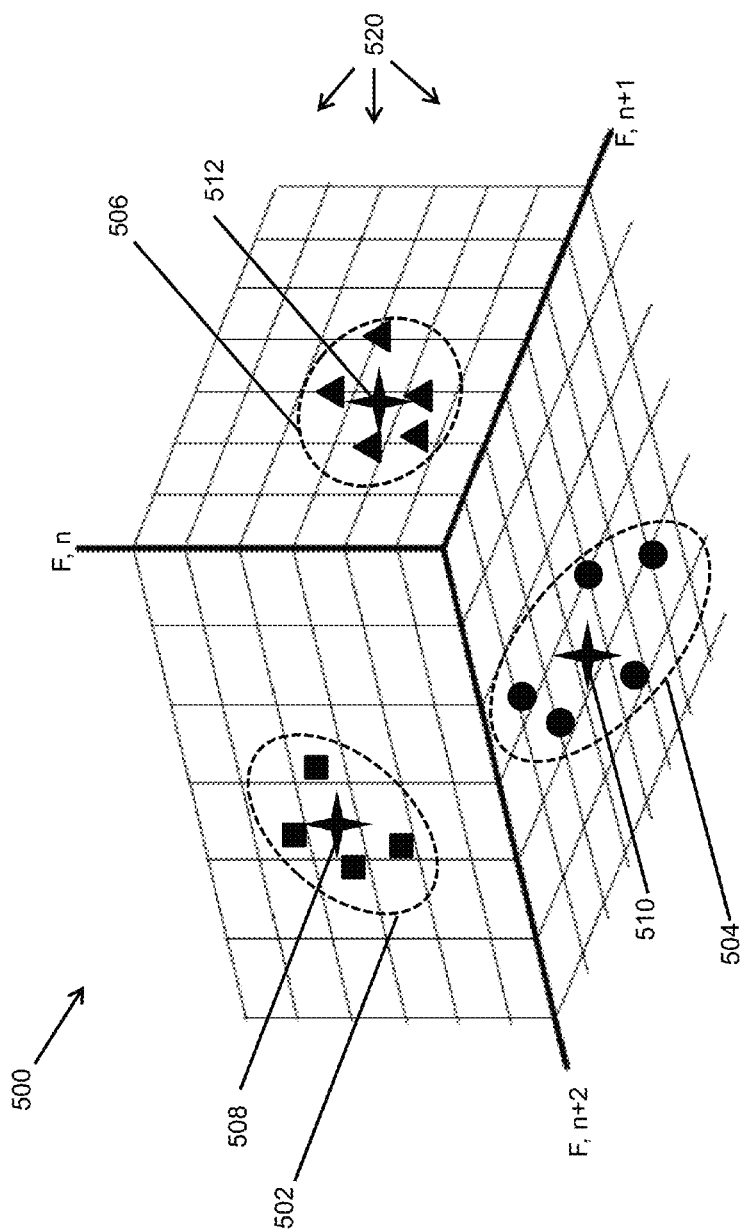
Figure 5D:
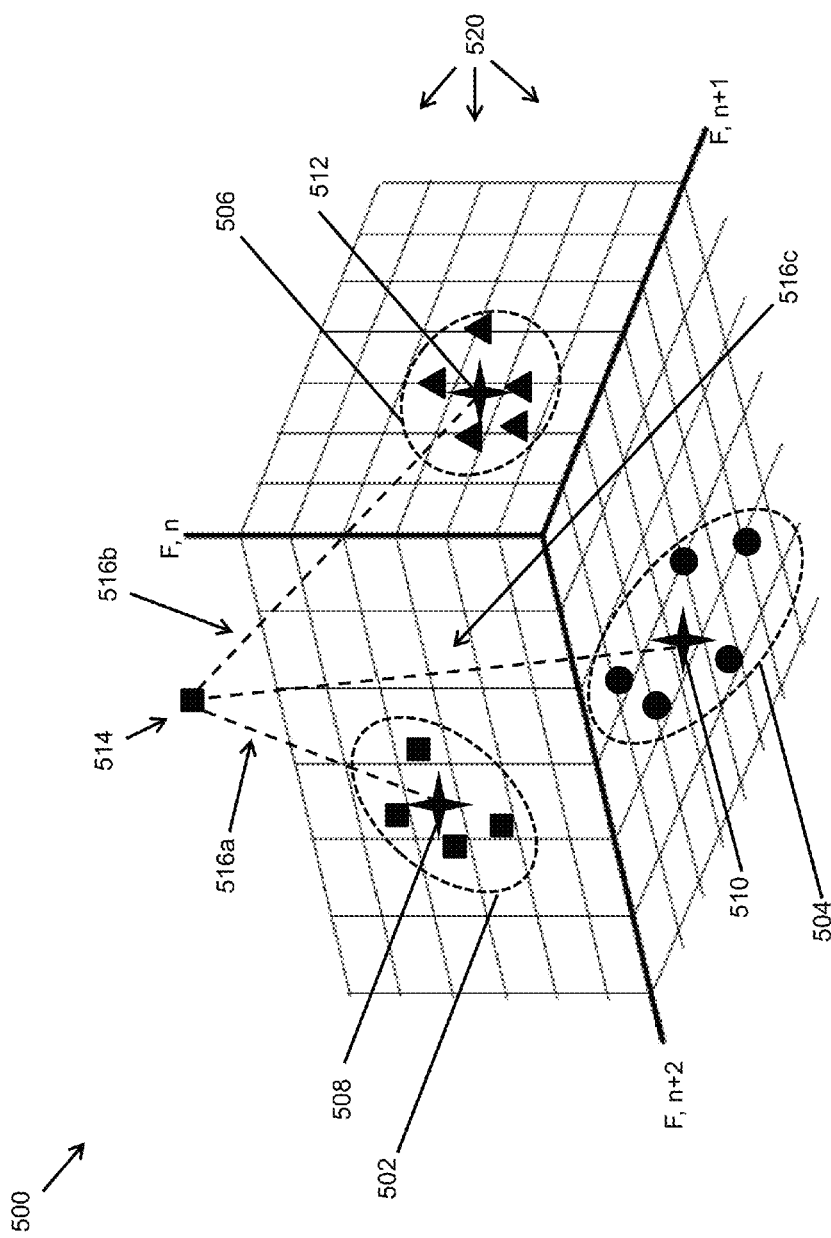

At 406 (FIG. 4), after the network events are mapped in the n-dimensional feature space, clusters can be identified using centroid algorithms and the corresponding centers of gravity can be determined, as also illustrated in FIG. 5C. Though various approaches may be used to cluster the network activities, centroid algorithms are implemented here as an example. Generally, centroid algorithms work by calculating the center of mass for a group of items. One of ordinary skill in the art appreciates that some centroid algorithms may use discrete numerical computations and others may instead apply analytical approaches, such as integral calculus, to find the center of mass for a given group.

Referring to FIG. 5C, the square network activity 502 may be grouped together using processors in the network module to calculate centroid algorithms on the group 502 to find the center point for the group, which is shown in FIG. 5C as a center point 508 which here is visually represented as a star in the middle of the square network client group 502. Similarly, the triangle network activity group 506 may be grouped using the centroid algorithms to find the center point (e.g., centroid) for the group. As illustrated, the triangle client group has a center point 512 represented by a star, and the circle client group 504 has a center point 510 also represented by a star. Collectively, the network activity groups along with their respective center of gravity stars can be referred to as the network cluster map 520 which can be further manipulated and customized as a data item or data structure. It is noted that the network cluster map 520 may appear differently for different companies, or different implementations. Thus, the network cluster map 520 creates a type of passive network signature for the network without disrupting the network or requiring in-depth customizations that may slow the network down.

Referring to FIG. 4 at 408, once the network cluster map 520 is created it may be output to the client mapper module 314 for further processing. It is noted here however, that the network cluster map 520 can be implemented in a sliding window that dynamically updates as new network points are received and plotted in the map 520. In some embodiments, the sliding window may be set to a certain duration. For example, if a network cluster map covers 60 minutes of activity, the network cluster map 520 may be updated every 10 minutes and each time would cover the prior 60 minutes of observed activity.

In some embodiments, as new network traffic is received the network map may be updated with the new data. In some embodiments, data in a network map older than a specified time (e.g., one-hour) may be removed. Thus the network map may correspond to a sliding window that is constantly updated to reflect recent events and changes. In some embodiments, new network traffic points added to their closest respective groups. For example, referring to FIG. 5D, if a new network activity point 514 is input into the n-dimensional feature space 500, it can be added to one of the network activity feature groups by calculating the distance to each of the feature groups' center of gravity and adding the new network activity point to the group with the closest center of gravity. As applied here, the network cluster mapper module can calculate the distance from the new network activity point 514 to the respective network activity center of gravity points 508, 510, and 512. In particular, the distance from new network activity point 514 to the square group's center of gravity 508 is represented as 516*a*. Similarly, the distance from the new network activity point 514 to the circle group's center of gravity 510 is represented as 516*c*, and the distance from the new network activity point 514 to the triangle group's center of gravity 512 is represented as 516*b*.

Though the network mapper module 312 can use precise distance measurements to find the shortest path, in this example it is apparent that new network activity point 514 is closest to the square center of gravity 508. Thus, the new network activity point 514 may be categorized with the square network activity group 502. In this way, one or more new network activity points can be added to the n-dimensional feature space 500 and clustered or grouped together with the existing groups based at least in part on distance calculations or other methods.

Figure 6:
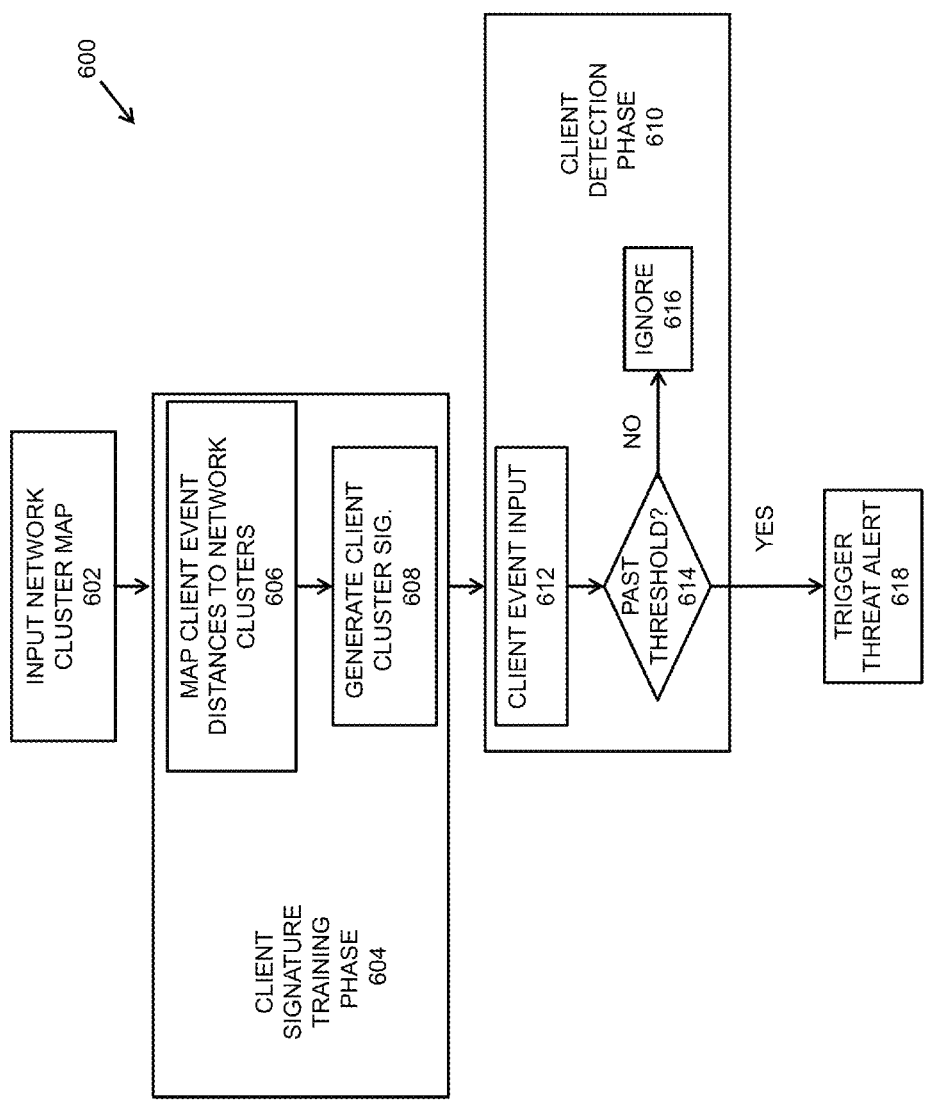
FIG. 6 shows a flowchart of an approach for generating a client signature and detecting threats using the client signature.
Figure 7A:
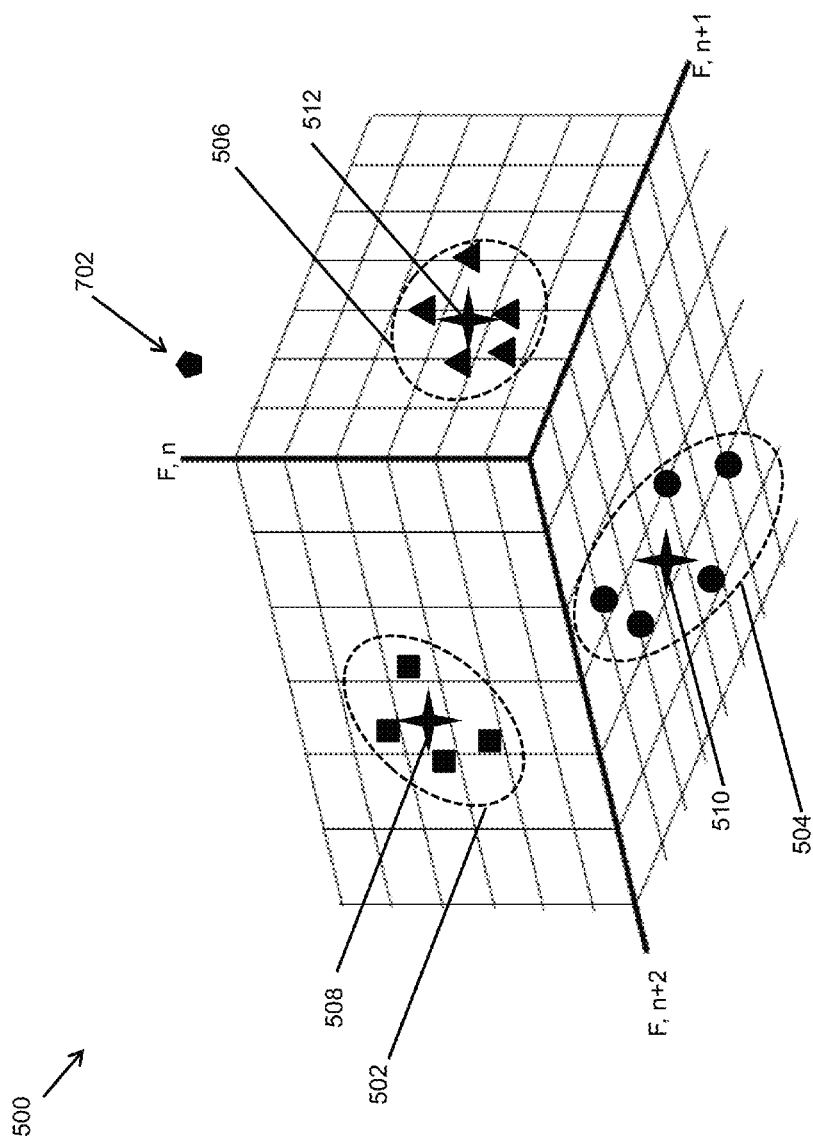
FIGS. 7A-7F illustrate example steps and diagrams for generating a client signature and detecting threats using the client signature.

After the network cluster map 520 is generated, the cluster engine can use the network cluster map 520 to create client signatures. For greater understanding, FIG. 6 is explained with reference to FIG. 7A-F, which show n-dimensional feature space plots as well as client signature plots. To begin, at 602 in FIG. 6 the network cluster map 520 may be input into the client event analyzer 316 (FIG. 3). The client event analyzer 316 may then initiate a client signature training phase 604 to map client event distances and generate a client cluster signature. In particular, at 606, the client event analyzer maps individual client event distances to the center of gravity points for the respective network clusters, as illustrated in FIG. 7A. There, a new client activity is represented as a pentagon shape 702 in the n-dimensional feature space 500.

Figure 7B:
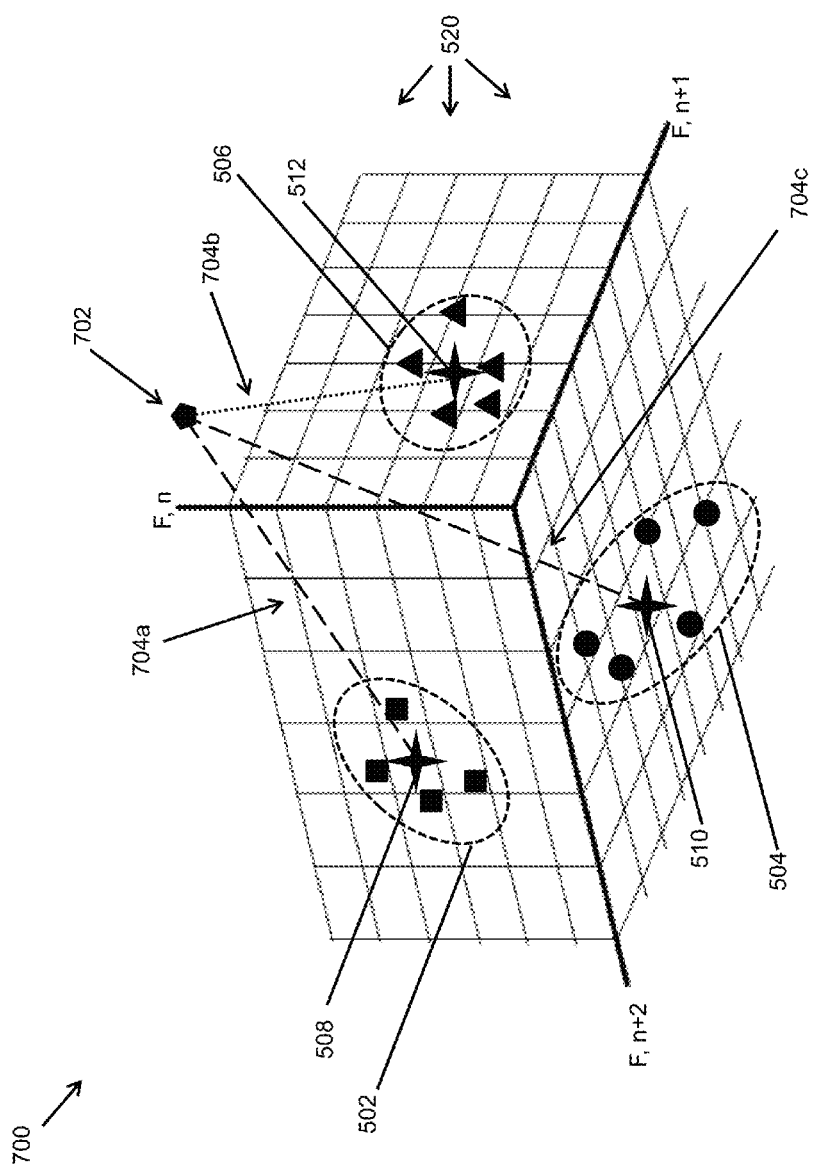

FIG. 7B illustrates how the new client activity 702 may be characterized or aggregated against the network cluster map 520. Specifically, the client event analyzer module 316 can calculate distances from the new client activity 702 to the square center of gravity 508 to generate the distance 704*a*, and likewise, can calculate the distance from new client activity 702 to the circle center of gravity 510 to generate the distance 704*c*, and can calculate the distance from new client activity 702 to the triangle center of gravity 512 to generate the distance 704*b*.

Figure 7C:
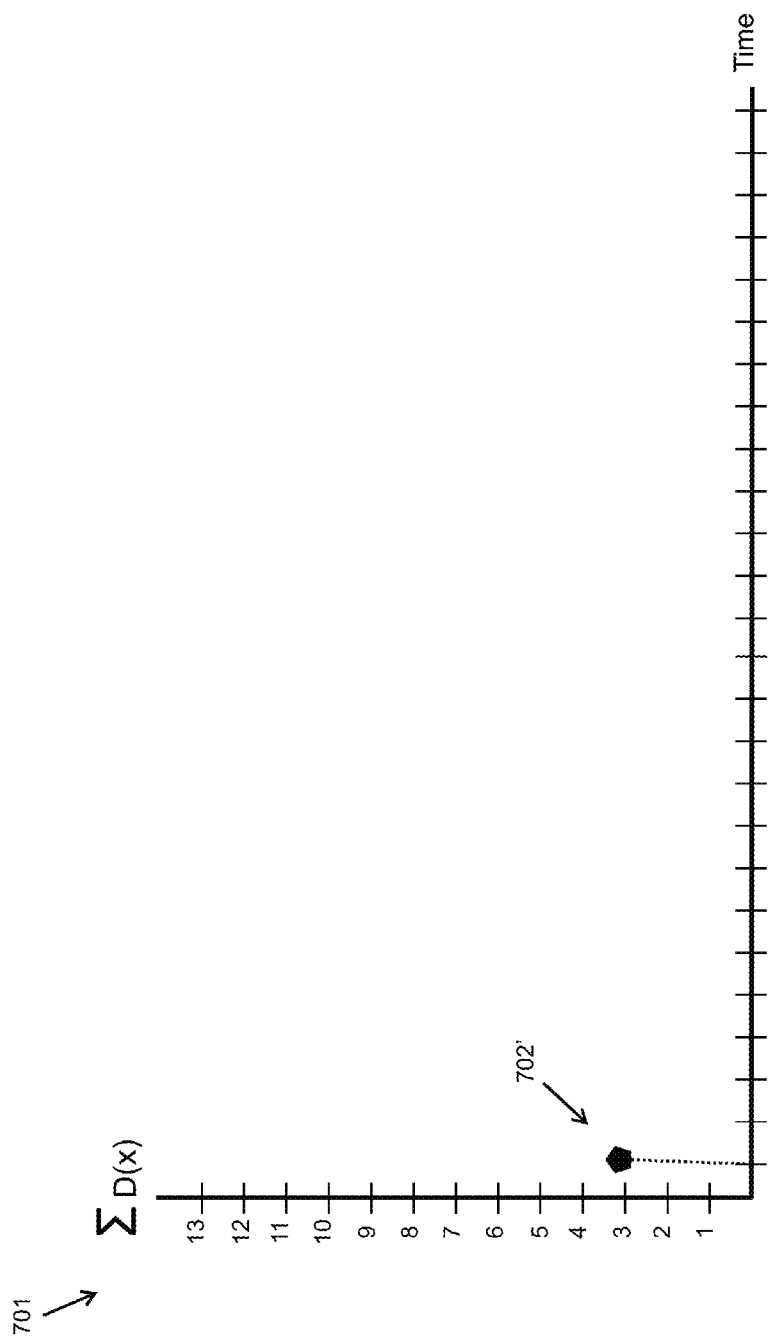

Referring to FIG. 6, at 608 the new client activity 702 is summarized or otherwise aggregated and then plot in a client signature plot. FIG. 7C shows one example embodiment of a client signature plot 701. One process that may be used to aggregate the new client activity 702 so that it may be placed on the client signature plot 701 is to compute the distance between client activity 702 and the closest center of gravity among 508, 510 and 512, i.e. the minimum between the distances 704*a*, 704*b*, and 704*c* (FIG. 7B). The distance between the client activity point 702 and the nearest center of gravity point may be used to plot the client activity point on the client signature plot (e.g. in FIG. 7C the dotted line from 702' to the horizontal axis corresponds to the distance between 702 and 512 in FIG. 7B).

While in other embodiments, the distances between the client point under analysis to each of the center of gravity points is averaged to generate an average distance, which may be used to plot the point under analysis in the client signature plot. For example, In FIG. 7B, client point 702 may be plotted and the distances between client point 702 to each center of gravity point may be determined; thus 704*a-c* would be determined. Then, the three determined distances may be averaged to generate an average distance value. That average distance value for the client point 702 may set the height (y-axis value) of the client point 702' in client plot 701 (of FIG. 7C). Similarly, several new client activity events may be aggregated the same way (e.g. using averaging operations), to yield the average distance from a collection of client activity events in a given time window (see FIG. 7D). Further, though the embodiment explained here may generates the client signature distances using least distance or average methods, one of ordinary skill in the art appreciates that other mathematical processes and/or algorithms can also be implemented to summarize or otherwise aggregate client activities so that they may be added to a client signature plot.

Figure 7D:
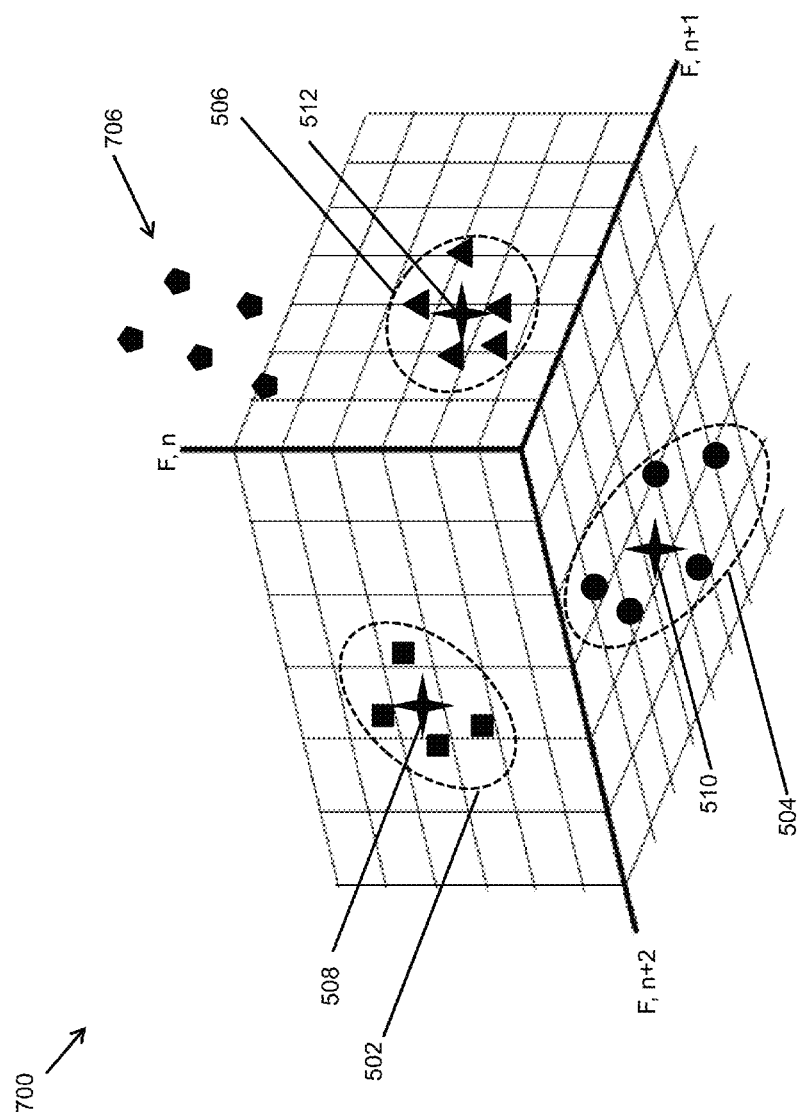
Figure 7E:
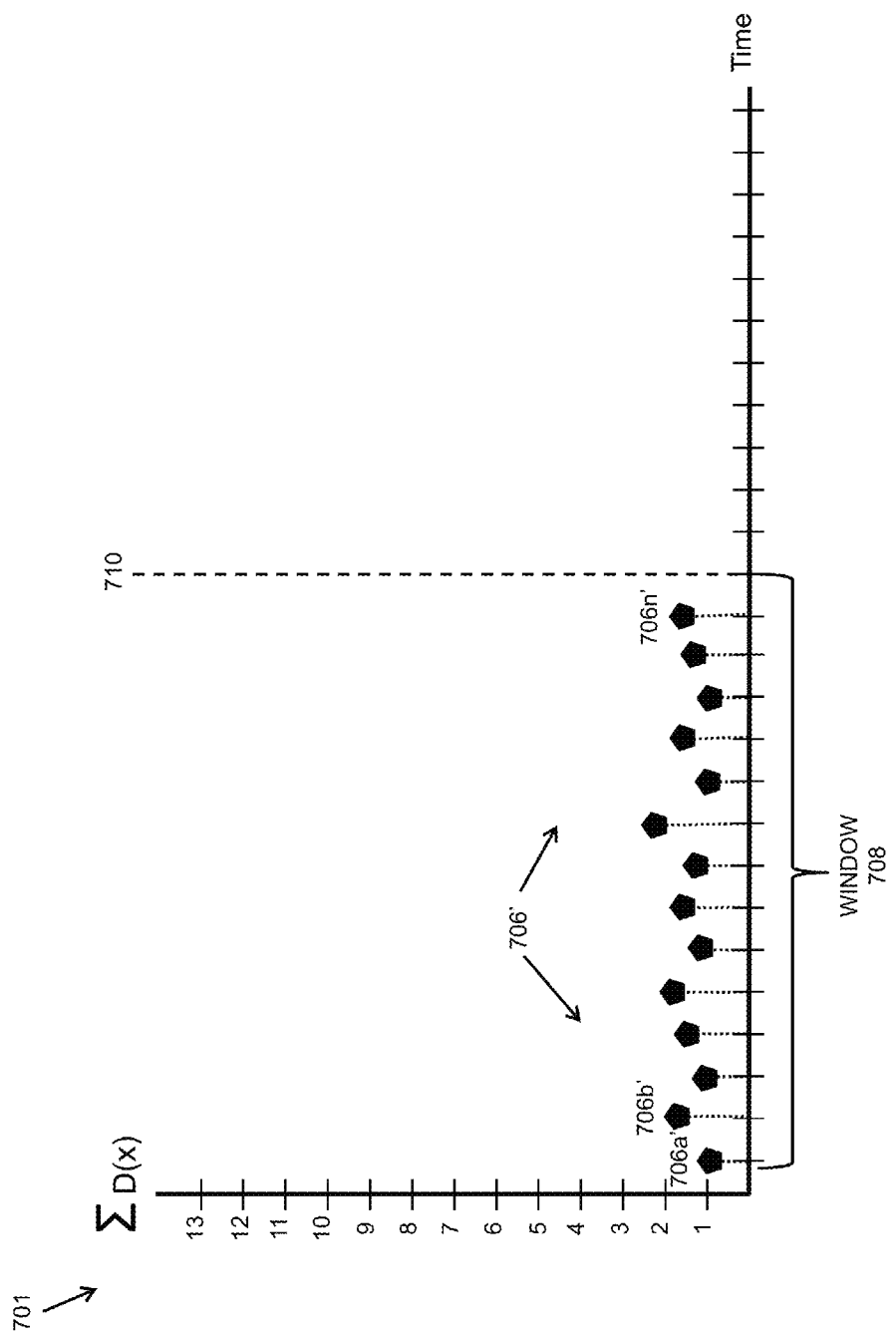

FIG. 7D shows a number of new client activity points 706 that may belong to a client that can be used in a client signature training phase to create a client signature, as illustrated in FIG. 7E. Specifically, as each of the new client activity points in 706 is analyzed, it may be aggregated using a process such as averaging, and then added to the client signature plot 701 in a training window 708 (in FIG. 7E). In some embodiments, the training window 708 can correspond to a sliding window 45 minutes wide and ending at 710. Thus, as new client activity points 706' are input, the aggregated client activity points in the training window are similarly updated dynamically, or in a rolling manner. One of ordinary skill in the art appreciates though 45 minutes is used here as an example time duration, other durations shorter or longer may be implemented to tune the system to a specific network environment.

Figure 7F:
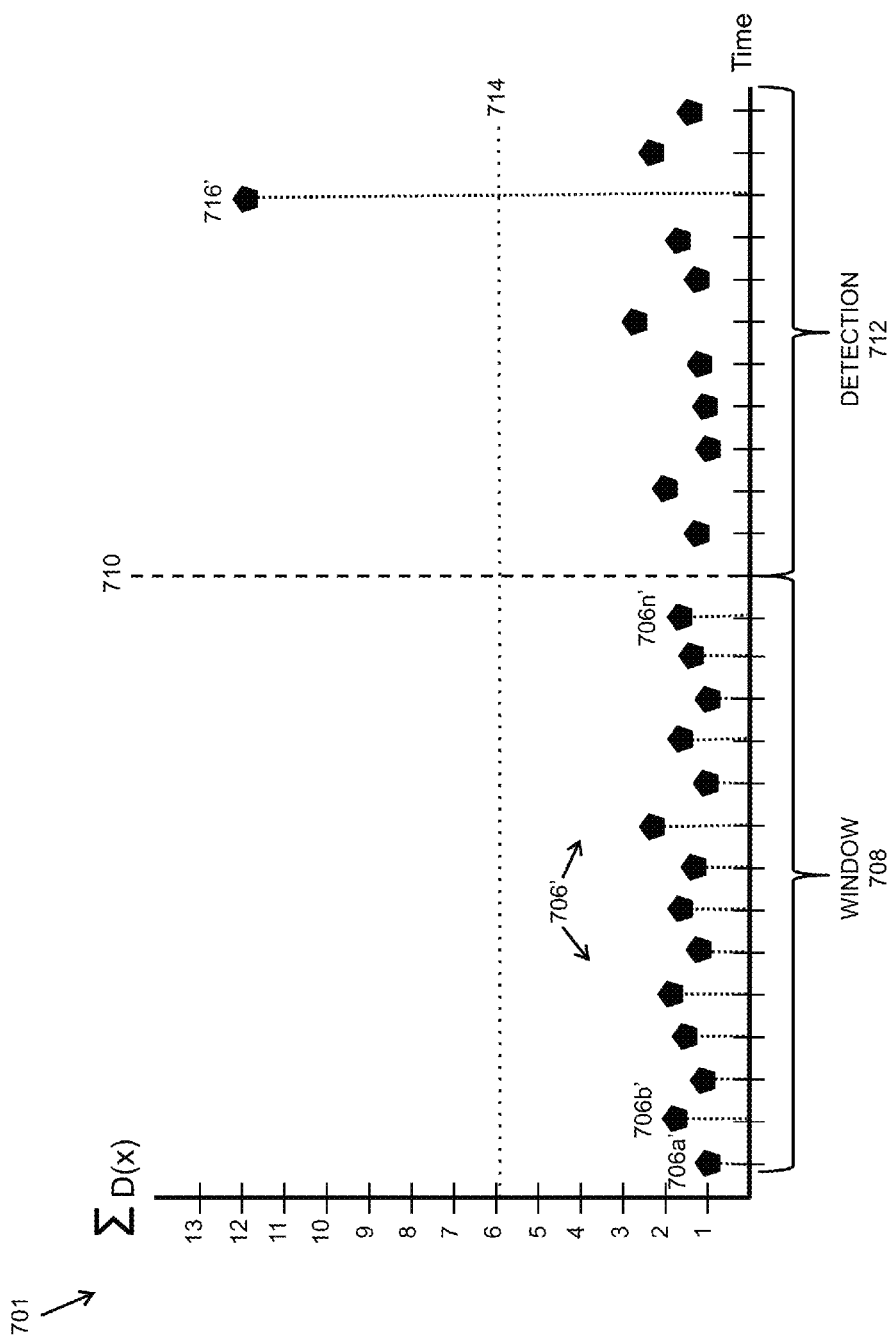

Referring to FIG. 6, once the client signature is generated, the cluster engine may initiate a client detection phase 610 to detect threats. In particular, at 612, client events are input in the detection phase, as shown in FIG. 7F as a detection window 712. There, the threshold 714 as been generated using the aggregated client activity points 706'. In some embodiments, a threshold may set equal to the average vertical distance of all the client activity points 706' multiplied by a threshold factor. For example, in FIG. 7E, 706*a*' is at a set vertical distance from the horizontal axis (as denoted by the dotted line from 706*a*' to the horizontal axis), similarly 706*b*' and 706*n*' are also at set vertical distances from the horizontal axis. Similarly, all of the client activity points 706' may then have their respective vertical distances to the horizontal axis averaged to create an average vertical distance for the new client activity points 706'.

In some embodiments, the threshold distance from the x-axis may be adjusted as a function of the client signature data. For example, the vertical distances of respective client activity points 706' may be averaged to get an average value for the client based signature. Then, a multiplicative factor may be applied to the average value to get the threshold height value. For example, the threshold factor may be set to "3×" or "5×" times the average value, thereby setting threshold 714 three times higher or five times higher than the client points 706'. Though in this example, the client points are averaged, in some embodiments the normalization through mean, and/or standard deviation may be used instead or with the averaging process and multiplication factor.

The threshold factor may be increased or decreased as needed. For example, in a calm network, the threshold factor may be set lower because the client activity points 706' are relatively stable. Whereas, for example, in a turbulent network the threshold may be set higher so as to avoid false alarms (e.g., which may be caused by anomalous client points exceeding the threshold due to harmless network volatility). Further, in some embodiments the threshold may be based at least in part on other processes and operations, including but not limited to, normalization through mean and standard deviation of the client activity points 706'.

The threshold 714 may then be used in the detection phase 712 such that if a client activity point exceeds the threshold 714 it is further scrutinized and possibly marked as malicious activity.

In particular, referring to FIG. 6 at 614 a new client event is analyzed to determine whether the client event passes the threshold. If it does not, it may be ignored at 616, but it can still be used to update the client signature (once the point enters window 708, for example). However, if the client point is past the threshold, alarm data may be generated at 618. In particular referring to FIG. 7F, new client activity 716' has been detected as exceeding the threshold 714, as its vertical distance exceeds the threshold 714. In this particular case, since all of the other points shown in FIG. 7F are relatively stable (e.g. roughly the same vertical distance from the horizontal axis), the new client activity point 716' can appropriately be designated as malicious activity and alarms may be generated an output.

Figure 8:
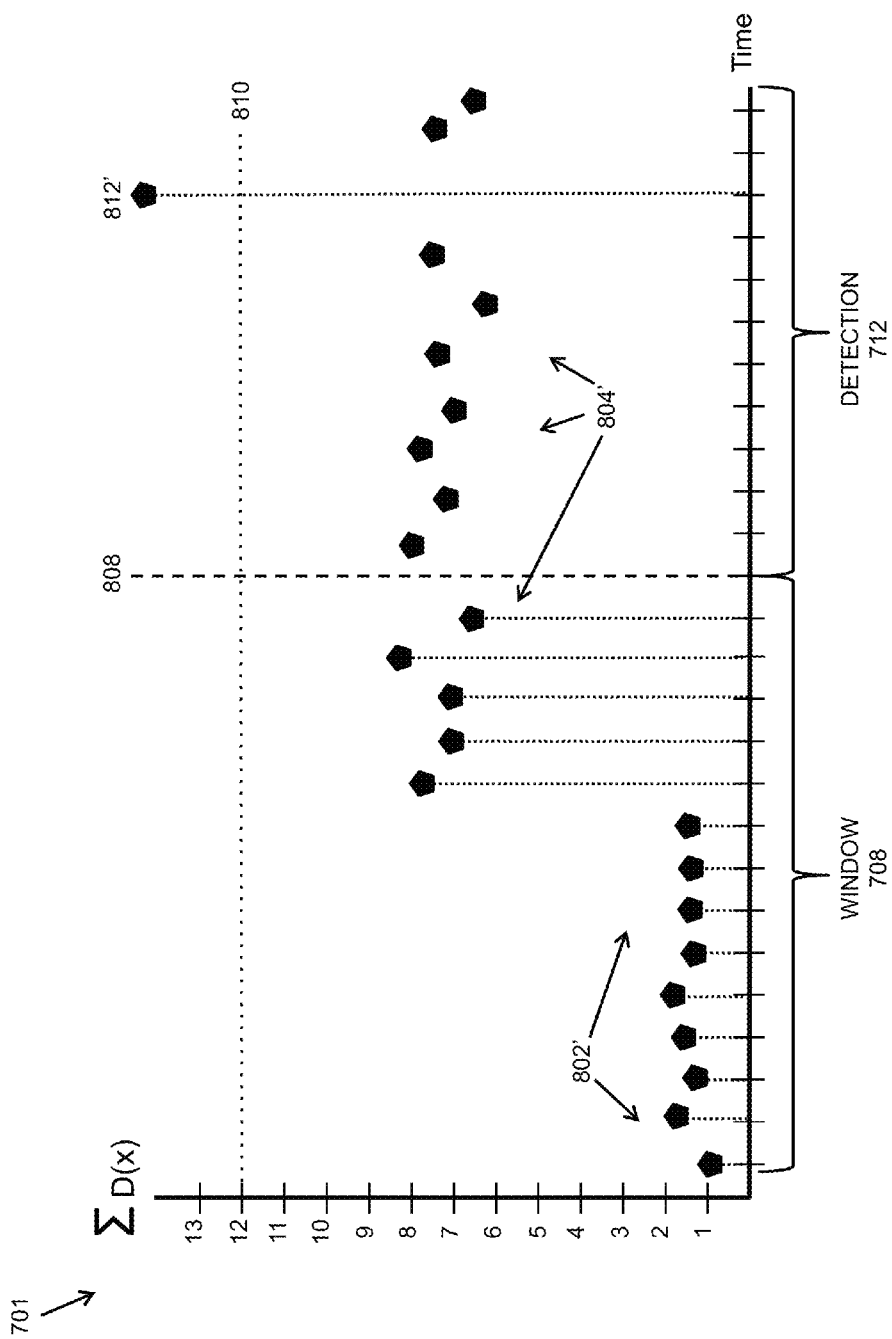
FIG. 8 illustrates an example approach for detecting threats using a client signature.

In contrast, referring to FIG. 8, the client activity points in the sliding window 800 have notably shifted, which may occur, for example, when an enterprise changes its network environment. In particular network activity points 802' exhibit a low average vertical distance, whereas the network activity points 804' exhibit a higher vertically shifted distance. As explained, the threshold 810 may be generated by taking the average of the network activity points and multiplying the result by a threshold factor. Applied here, the threshold 810 is notably shifted upwards due to the vertical shift of the network points 804 that lie within the training window 800 region.

In cases where the client signature is unstable and/or shows sudden changes in behavior (FIG. 8), the threshold 810 (that is dynamically recomputed as new points are added to the client signature) may be adjusted to higher values in response to the unstable client signature. In this way, the activity 812' exceeding the threshold is effectively representing a real suspicious activity flagged by the threat module 314 instead of a potentially innocuous one due to the unstable nature of the client signature.

As noted the threshold may be modified per threshold factor (e.g., 3×, 4×). In some embodiments, the client threat module 314 can tune the threshold factor to change the strictness policy to match individual networks. For example, in a network that is constantly changing, points may frequently exceed a threshold if the threshold is set too low or close to the signature points. Thus, in such a turbulent environment the threat module may have a looser "wait and see" policy that only triggers an alert, for example, if five points exceed a threshold. Alternatively, a loose threat policy may be implemented by simply setting the threshold 810 higher using a larger threshold multiplication factor, such as "10×".

In contrast, a network with a stable client signature can set a threshold very close to the client signature points, so that if any one point exceeds the threshold an alarm is generated. Similarly, even in turbulent dynamic networks with an unstable client signature, one may still intentionally set low thresholds, so that every client activity point that exceeds the threshold can be manually analyzed to determine if it is an actual threat. Such a system may be preferred for high security situations, such as a network implemented in a banking environment, where it may be preferable to analyze every potential suspicious activity that exceeds a low-set threshold.

Thus, what has been disclosed herein is a passive approach for threat detection that works well even on networks that employ secure authentication protocols, such as Kerberos. Further, because the methods and systems disclosed herein work passively on any network, companies can readily implement such a system into their network infrastructure to gain immediate threat detection controls without modifying the network with costly upgrades or waiting for trusted third party security companies to send threat-specific security updates.

System Architecture Overview

Figure 9:
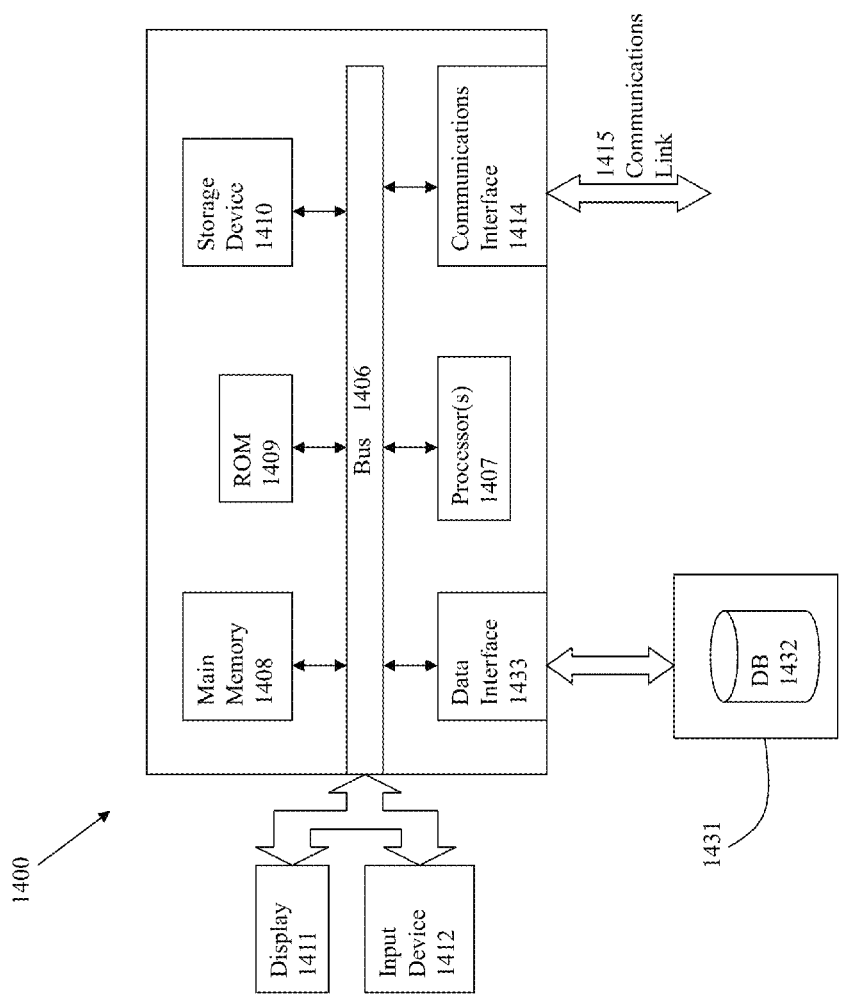
FIG. 9 illustrates example system architecture.

FIG. 9 is a block diagram of an illustrative computing system 1400 suitable for implementing an embodiment for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for detecting network threats, comprising:
   receiving network traffic by tapping a network device that routes network communications generated by a plurality of clients in a network;
   mapping the network traffic in a network feature space as a first set of client points;
   forming client groups from the first set of clients points, wherein points in a client group share a center point;
   mapping distances from a second set of client points to the client groups in the network feature space;
   generating client signature data corresponding to a plot, the plot comprising a first axis corresponding to a distance between the second set of client points and one or more client groups and a second axis associated with time, the second axis comprising of a first window and a second window, wherein the client signature data comprises a series of client points that are added to a first window along a first axis, the series of client point comprising a height along a second axis, the height corresponding to the distance from an individual client point from among the series of client points to the one or more of the client groups, wherein a portion of the client signature data corresponds to a sliding window;
   initiating a detection phase that identifies abnormal network behavior by:
      inputting one or more client activity events from the network traffic along the first axis in the second window, and
      generating a dynamic threshold based at least on aggregated client activity points from at least the first window, wherein the dynamic threshold corresponding to a set distance from the first axis at least in the second window is updated in response to new client activity points entering a sliding window;
   tuning the dynamic threshold to change a strictness policy to match individual networks; and
   generating alarm data in response to the one or more client activity events exceeding the dynamic threshold, wherein the alarm data indicates a threat detection.

2. The method of claim 1, wherein the dynamic threshold is adjustable as a function of the client signature data.

3. The method of claim 2, wherein the function applies one or more of following to the client signature data: averaging, normalization through mean, or standard deviation, and a multiplication factor.

4. The method of claim 1, wherein a client point in the client signature data is computed by averaging the distances from the client point to the client groups.

5. The method of claim 1, wherein new points are added to the first set of client points, wherein individual points of the new points are grouped together with a respective closest client group.

6. The method of claim 1, wherein the closest client group for an individual point is determined by measuring the distance between the individual point and a centroid of the closest client group.

7. The method of claim 1, wherein the network feature space is an n-dimensional feature space having one or more axes that correspond to different types of network features and the first set of client points are mapped in the network feature space according to their respective values in relation to the one or more axes.

8. The method of claim 7, wherein the one or more axes correspond to one or more of the following features: a client identifier, a server identifier, a control module identifier, account information, services accessed, and/or a number of times a service is accessed.

9. A system for detecting network threats, comprising:
   a computer processor to execute a set of program code instructions;
   a memory to hold the set of program code instructions, in which the set of program code instructions comprises program code to perform:
      receive network traffic by tapping a network device that routes network communications generated by a plurality of clients in a network;
      map the network traffic in a network feature space as a first set of client points;
      form client groups from the first set of clients points, wherein points in a client group share a center point;
      map distances from a second set of client points to the client groups in the network feature space;
      generate client signature data corresponding to a plot, the plot comprising a first axis corresponding to a distance between the second set of client points and one or more client groups and a second axis associated with time, the second axis comprising of a first window and a second window, wherein the client signature data comprises a series of client points that are added to a first window along a first axis, the series of client point comprising a height along a second axis, the height corresponding to the distance from an individual client point from among the series of client points to the one or more of the client groups, wherein a portion of the client signature data corresponds to a sliding window;
      initiate a detection phase that identifies abnormal network behavior by:
         inputting one or more client activity events from the network traffic along the first axis in the second window, and
         generating a dynamic threshold based at least on aggregated client activity points from at least the first window, wherein the dynamic threshold corresponding to a set distance from the first axis at least in the second window is updated in response to new client activity points entering a sliding window;
tuning the dynamic threshold to change a strictness policy to match individual networks; and
generate alarm data in response to one or more client activity events exceeding the dynamic threshold, wherein the alarm data indicates a threat detection.

10. The system of claim 9, wherein the dynamic threshold is adjustable as a function of the client signature data.

11. The system of claim 10, wherein the function applies one or more of following to the client signature data: averaging, normalization through mean, or standard deviation, and a multiplication factor.

12. The system of claim 9, wherein a client point in the client signature data is computed by averaging the distances from the client point to the client groups.

13. The system of claim 9, wherein new points are added to the first set of client points, wherein individual points of the new points are grouped together with a respective closest client group.

14. The system of claim 9, wherein the closest client group for an individual point is determined by measuring the distance between the individual point and a centroid of the closest client group.

15. The system of claim 9, wherein the network feature space is an n-dimensional feature space having one or more axes that correspond to different types of network features and the first set of client points are mapped in the network feature space according to a respective values in relation to the one or more axes.

16. The system of claim 15, wherein the one or more axes correspond to one or more of the following features: a client identifier, a server identifier, a control module identifier, account information, services accessed, and/or a number of times a service is accessed.

17. A computer program product embodied on a non-transitory computer readable medium, the non-transitory computer readable medium having stored thereon a sequence of instructions which, when executed by a processor causes the processor to execute a method for detecting network threats, the method comprising:
receiving network traffic by tapping a network device that routes network communications generated by a plurality of clients in a network;
mapping the network traffic in a network feature space as a first set of client points;
forming client groups from the first set of clients points, wherein points in a client group share a center point;
mapping distances from a second set of client points to the client groups in the network feature space;
generating client signature data corresponding to a plot, the plot comprising a first axis corresponding to a distance between the second set of client points and one or more client groups and a second axis associated with time, the second axis comprising of a first window and a second window, wherein the client signature data comprises a series of client points that are added to a first window along a first axis, the series of client point comprising a height along a second axis, the height corresponding to the distance from an individual client point from among the series of client points to the one or more of the client groups, wherein a portion of the client signature data corresponds to a sliding window;
initiating a detection phase that identifies abnormal network behavior by:
inputting one or more client activity events from the network traffic along the first axis in the second window, and
generating a dynamic threshold based at least on aggregated client activity points from at least the first window, wherein the dynamic threshold corresponding to a set distance from the first axis at least in the second window is updated in response to new client activity points entering a sliding window;
tuning the dynamic threshold to change a strictness policy to match individual networks; and
generating alarm data in response to the one or more client activity events exceeding the dynamic threshold, wherein the alarm data indicates a threat detection.

18. The computer program product of claim 17, wherein the dynamic threshold is adjustable as a function of the client signature data.

19. The computer program product of claim 18, wherein the function applies one or more of following to the client signature data: averaging, normalization through mean, or standard deviation, and a multiplication factor.

20. The computer program product of claim 17, wherein a client point in the client signature data is computed by averaging the distances from the client point to the client groups.

21. The computer program product of claim 17, wherein new points are added to the first set of client points, wherein individual points of the new points are grouped together with a respective closest client group.

22. The computer program product of claim 17, wherein the closest client group for an individual point is determined by measuring the distance between the individual point and a centroid of the closest client group.

23. The computer program product of claim 17, wherein the network feature space is an n-dimensional feature space having one or more axes that correspond to different types of network features and the first set of client points are mapped in the network feature space according to their respective values in relation to the one or more axes.

24. The computer program product of claim 23, wherein the one or more axes correspond to one or more of the following features: a client identifier, a server identifier, a control module identifier, account information, services accessed, and/or a number of times a service is accessed.

* * * * *